Jan. 30, 1923.
W. M. BARNES.
ANTIFRICTION ROLLER BEARING FOR WHEELS.
FILED NOV. 17, 1919.
1,443,829.
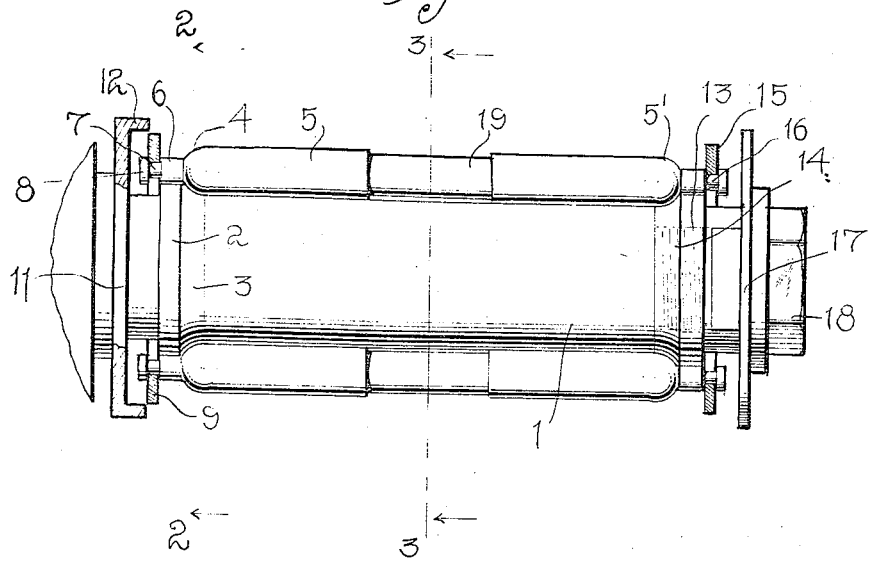
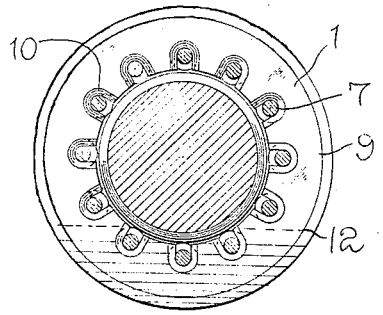 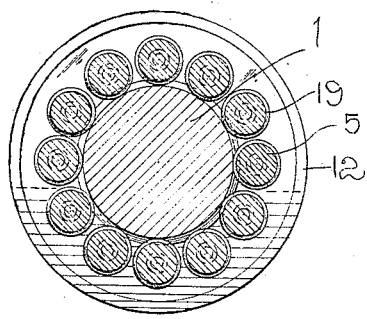
Inventor:
W. M. Barnes
By Attorney Patented Jan. 30, 1923.

1,443,829

UNITED STATES PATENT OFFICE.

WILLIAM M. BARNES, OF CIRCLEVILLE, OHIO.

ANTIFRICTION ROLLER BEARING FOR WHEELS.

Application filed November 17, 1919. Serial No. 338,664.

*To all whom it may concern:*

Be it known that I, WILLIAM M. BARNES, a citizen of the United States, residing at Circleville, in the county of Pickaway and State of Ohio, have invented certain new and useful Improvements in Antifriction Roller Bearings for Wheels; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in anti-friction roller bearings combined, for use on vehicle wheels, and consists of a simple and efficient means of this nature whereby the friction, incident to rotating the parts, may be reduced to a minimum.

The invention comprises a simple and efficient apparatus of this nature having various details of construction, combination and arrangement of parts which will be hereinafter fully described, shown in the accompanying drawings and then specifically defined in the appended claim.

My invention is illustrated in the accompanying drawings which, with the numerals of reference marked thereon, form a part of this application, and in which:

Figure 1 is a side elevation showing the application of my invention to an axle and wheel.

Figure 2 is a sectional view on line 2—2 of Figure 1, and

Figure 3 is a sectional view on line 3—3 of Figure 1.

Reference now being had to the details of the drawings by numerals:

1 designates an axle having a shoulder 2, one side of which is concaved as at 3, forming a bearing for the convexed shoulders 4, formed at the inner ends of the rollers 5, and which in practice are slightly out of contact with the circumference of the shoulder 2, and each shoulder 4 having a reduced cylindrical portion 6 and still smaller reduced portion 7 and terminating in a head 8. A spacing ring 9 is provided with a series of concaved recesses 10 formed in its periphery, for the purpose of keeping the rollers the proper distance from each other and to carry the rollers in proper position as they revolve around the spindle.

11 designates a dust guard having a central aperture to fit over the axle of the wheel and provided with flanges 12 which will tend to prevent foreign matter from entering the space intermediate the inner ends of the rollers and the spacing wheel in which the same have bearings.

A special tap 13 has threaded connection with the axle and has a concaved shoulder 14 forming a bearing for the convexed shoulders 5' formed at the outer ends of the rollers 5. A spacing ring 15, of similar construction to the ring 9 described, has a series of scalloped recesses in its inner periphery for the reception of the contracted parts 16 at the outer ends of the rollers, and 17 is a dust guard fitted over the cylindrical portion of the nut 18 which is adapted to have threaded connection with the outer end of the axle, and when threaded into place holds the dust guard from working off.

The central portion of each of the rollers has a reduced part 19 and which affords means whereby any dust or foreign matter which may enter between the bearing ends of the rollers and the axle or tap thereon, forming the bearings for the latter, may accumulate. It is obvious, of course, that such a bearing as that disclosed would have no utility without a hub structure which would surround the roller organization. Such hub structure would also naturally be provided with spherically tapered flanges to engage the semi-spherical ends of the rollers, but the hub structure is not disclosed herein and forms no part of the present invention. In assembling the device a sleeve of some kind is employed which would naturally be the hub just referred to. The rollers are positioned within the hub by being placed about its inner periphery moving from the center radially and seated in the notches 10 of the rings 9 and 15. The rollers are retained in engagement with the interior of the sleeve in any approved manner, one such instrumentality being a collar slotted sufficiently to permit one roller to pass through. This collar would be inserted within the roller structure and a single roller dropped through the slot into engagement with the rings 9 and 15 and slightly rotated to permit the insertion of another, this being repeated until the entire roller organization is in engagement with the rings 9 and 15. The spindle 1 with the tap 14 removed, is now inserted within the organized roller structure, still held in the sleeve or hub, pushing the collar out as the spindle is inserted. When the spindle has been inserted to take the place of the collar, the tap 14 is put into position, providing thereby the two spherically tapered shoulders 3 and 14.

In operation, when the parts are adjusted as shown in the drawings, it will be noted that the body portions of the rollers bear upon the spindle, and the end thrust is upon the transversely curved shoulders 3 and 14, the weight or load thus being upon the curved ends of the rollers as well as upon the surface of the spindle, thus reducing the friction to a minimum, making it possible for a vehicle equipped with my bearings to carry loads of special weight.

When putting the wheel on the spindle the rollers are first put into the hub boxing and are kept from dropping out of the cut-out spaces in the spacing rings 9 by using a cylinder of approximately the same diameter as the spindle. This cylinder is a split cylinder; that is to say, has a longitudinal slot extending from end to end thereof of a width equal to the diameter of the rollers; and the rollers are inserted through the slot one at a time until the twelve rollers are fitted into the spacing rings. Then, as the wheel is put on, the spindle pushes the cylinder out.

The member 13, or special tap, can be threaded on the axle because the inner circumference of the spacing rings 9 is larger than the outer circumference of the member 13 and the shoulder on the back part of the spindle. This readily allows the wheel, with the assembled rollers and spacing wheels and the said three-inch cylinder inside the rollers, to be slid on the axle, the spindle pushing the cylinder out. Then the member 13 is threaded on; then the dust guard pushed on the member 13 and lastly the outside tap is threaded on.

What I claim to be new is:

A bearing comprising in combination a spindle and a tap therefor, circumferential ribs carried by the spindle and tap respectively and spaced apart, the proximate sides of said ribs being spherically tapered, a roller structure comprising spacing rings the central openings of which are diametrically larger than the ribs and provided with spaced recesses offset from the central opening, rollers surrounding the spindle having extremities complementary to and bearing against the spherical tapers of the ribs, and trunnions extending axially from the ends of said rollers and rolling upon the perimeters of said ribs and extending through the spacing rings and having circumferential furrows forming bearings in the said offset recesses.

In testimony whereof I hereunto affix my signature.

WILLIAM M. BARNES